US012058163B2

(12) United States Patent
O'Reilly et al.

(10) Patent No.: US 12,058,163 B2
(45) Date of Patent: Aug. 6, 2024

(54) SYSTEMS, MEDIA, AND METHODS FOR UTILIZING A CROSSWALK ALGORITHM TO IDENTIFY CONTROLS ACROSS FRAMEWORKS, AND FOR UTILIZING IDENTIFIED CONTROLS TO GENERATE CYBERSECURITY RISK ASSESSMENTS

(71) Applicant: CyberSaint, Inc., Boston, MA (US)

(72) Inventors: Padraic O'Reilly, Lincoln, MA (US); Henry Grover, Acton, MA (US); Scott Shidlovsky, Hooksett, NH (US)

(73) Assignee: CyberSaint, Inc., Boston, MA (US)

( * ) Notice: Subject to any disclaimer, the term of this patent is extended or adjusted under 35 U.S.C. 154(b) by 370 days.

(21) Appl. No.: 17/398,376

(22) Filed: Aug. 10, 2021

(65) Prior Publication Data
US 2023/0052116 A1  Feb. 16, 2023

(51) Int. Cl.
*H04L 9/40* (2022.01)
*G06F 18/214* (2023.01)
*H04L 41/16* (2022.01)

(52) U.S. Cl.
CPC .......... *H04L 63/1433* (2013.01); *H04L 41/16* (2013.01); *H04L 63/1416* (2013.01); *H04L 63/1466* (2013.01); *G06F 18/214* (2023.01)

(58) Field of Classification Search
CPC ... G06F 18/214; H04L 41/16; H04L 63/1416; H04L 63/1433; H04L 63/1466; H04L 63/20
See application file for complete search history.

(56) References Cited

U.S. PATENT DOCUMENTS 7,665,081 B1   2/2010 Pavlyushchik
9,177,139 B2  11/2015 Hull Roskos
(Continued)

OTHER PUBLICATIONS

National Institute of Standards and Technology (NIST) 800-53-Rev. 4, Security and Privacy Controls for Federal Information Systems and Organizations, Joint Task Force Transformation Initiative, U.S. Department of Commerce, Apr. 30, 2013.
(Continued)

*Primary Examiner* — Daniel B Potratz
*Assistant Examiner* — Matthias Habtegeorgis
(74) *Attorney, Agent, or Firm* — Cesari and McKenna, LLP

(57) ABSTRACT

In one or more embodiments, the disclosed systems, methods, and media include utilizing a crosswalk algorithm to identify controls (e.g., cybersecurity controls) across frameworks, and for utilizing identified controls to generate cybersecurity risk assessments. A cybersecurity module may identify one or more controls in a data structure. The process may utilize a crosswalk algorithm to determine a relatedness between the identified controls and different controls of different frameworks. The process may update the data structure with selected different controls, such that a more robust set of controls are identified when the cybersecurity module indexes into the data structure to identify particular controls. Additionally, the process may generate a risk assessment for a device/software. The process may generate a risk score for the risk assessment, and the risk score may be based on a determined compliance level for each control determined to be related to a defined risk of interest.

21 Claims, 8 Drawing Sheets

(56) References Cited

U.S. PATENT DOCUMENTS

| | | | |
|---|---|---|---|
| 9,280,911 | B2 | 3/2016 | Sadeh-Koniecpol et al. |
| 9,294,498 | B1 | 3/2016 | Yampolshiy et al. |
| 9,306,965 | B1 | 4/2016 | Grossman et al. |
| 9,373,267 | B2 | 6/2016 | Sadeh-Koniecpol et al. |
| 9,398,029 | B2 | 7/2016 | Sadeh-Koniecpol et al. |
| 9,501,647 | B2 | 11/2016 | Yampolskiy et al. |
| 9,558,677 | B2 | 1/2017 | Sadeh-Koniecpol et al. |
| 9,602,529 | B2 | 3/2017 | Jones et al. |
| 9,614,669 | B1 | 4/2017 | Cox, Jr. et al. |
| 9,774,626 | B1 | 9/2017 | Himler et al. |
| 9,781,149 | B1 | 10/2017 | Himler et al. |
| 9,813,454 | B2 | 11/2017 | Sadeh-Koniecpol et al. |
| 9,824,609 | B2 | 11/2017 | Sadeh-Koniecpol et al. |
| 9,870,715 | B2 | 1/2018 | Sadeh-Koniecpol et al. |
| 9,875,360 | B1 | 1/2018 | Grossman et al. |
| 10,339,321 | B2 | 7/2019 | Tedeschi |
| 2003/0140249 | A1 | 7/2003 | Tanunaka |
| 2006/0191010 | A1 | 8/2006 | Benjamin |
| 2007/0016955 | A1 | 1/2007 | Goldberg |
| 2007/0245420 | A1 | 10/2007 | Yong |
| 2012/0137367 | A1 | 5/2012 | Dupont |
| 2012/0159633 | A1 | 6/2012 | Grachev |
| 2013/0031037 | A1 | 1/2013 | Brandt |
| 2013/0031633 | A1 | 1/2013 | Honig |
| 2013/0238534 | A1 | 9/2013 | Nagarag |
| 2014/0007238 | A1 | 1/2014 | Magee |
| 2014/0053226 | A1 | 2/2014 | Fadida |
| 2015/0026061 | A1 | 1/2015 | Siegel |
| 2015/0172321 | A1 | 6/2015 | Kirti |
| 2015/0213369 | A1 | 7/2015 | Brandt |
| 2016/0219077 | A1 | 7/2016 | Pandya |
| 2017/0093923 | A1 | 3/2017 | Duan |
| 2017/0346846 | A1 | 11/2017 | Findlay |
| 2019/0281082 | A1* | 9/2019 | Carmichael ........... G06F 21/577 |
| 2020/0106801 | A1 | 4/2020 | Evans |
| 2020/0285755 | A1* | 9/2020 | Kassoumeh ....... G06Q 10/0635 |
| 2021/0049127 | A1* | 2/2021 | Kunchakarra ........ G06F 16/182 |
| 2022/0060499 | A1* | 2/2022 | Huda .................. H04L 63/1416 |

OTHER PUBLICATIONS

ISO/IEC 27000, International Standard, Information Technology—Security Techniques-Information Security Management Systems-Overview and Vocabulary, $4^{th}$ Edition, Feb. 15, 2016, 42 pages.

Framework for Improving Critical Infrastructure Cybersecurity, Version 1.0, National Institute of Standards and Technology, Feb. 12, 2014, 41 pages.

Defense Federal Acquisition Regulation Supplement (DFARS), Department of Defense, revised Jun. 7, 2016, uploaded in three parts.

Nist, "Framework for Improving Critical Infrastructure Cybersecurity" National Institute of Standards and Technology, Published Feb. 12, 2014, Retrieved from https://www.nist.gov/sites/default/files/documents/cyberframework/cybersecurity-framework-021214.pdf (year:2014).

* cited by examiner

```
"__text":"Always install with elevated privileges"
   },
   "State":{
      "__prefix":"q6",
      "__text":"Disabled"
```
Mapping:"CM-6"
Mapping:"AC-6"

```
"__text":"Do not preserve zone information in file attachments"
   },
   "State":{
      "__prefix":"q1",
```
Mapping:"CM-6"

```
"__text":"Configure Windows NTP Client"
   },
   "State":{
      "__prefix":"q1",
      "__text":"Enabled"
```
Mapping:"AU-8"
Mapping:"CM-6"
Mapping:"CM-7"

FIG. 2

| Control | Remediation(s) |
|---|---|
| CM-6 | Switch On One or more Alerts for a Designated Event |
| ⋮ | ⋮ |

*FIG. 7*

SYSTEMS, MEDIA, AND METHODS FOR UTILIZING A CROSSWALK ALGORITHM TO IDENTIFY CONTROLS ACROSS FRAMEWORKS, AND FOR UTILIZING IDENTIFIED CONTROLS TO GENERATE CYBERSECURITY RISK ASSESSMENTS

BACKGROUND

Technical Field

The present disclosure relates generally to cybersecurity, and more specifically to systems, methods, and media for utilizing a crosswalk algorithm to identify controls across frameworks, and for utilizing identified controls to generate cybersecurity risk assessments.

Background Information

Cybersecurity is a growing industry, as computers have become the leading devices for information storage and retrieval. To that end, and to ensure that information and computing systems are secure, compliance organizations have developed different catalogs (i.e., frameworks). These catalogues provide guidance, in the form of controls, as to how client computing systems, of an organization, should ensure that the information they store and the computing systems that they operate are secure. Each client may have different organizational attributes, desires, and needs such that certain controls may be more applicable than others.

Additionally, an organization may execute one or more scans, e.g., vulnerability scans, on the computing systems and/or applications executing thereon to identify one or more vulnerabilities, i.e., cybersecurity vulnerabilities. Typically, a user of the organization will have to manually analyze the scan results, which may be in terse syntax, to identify one or more corresponding controls that are related to information in the scan results. Performing such a manual process may be time consuming. Further, the user may also fail to fully comprehend the scan results and what problems/issues may arise from the identified vulnerabilities, which in turn may lead to the user being unable to identify all of the applicable controls. If the user cannot identify the applicable controls, the user cannot obtain a full understanding of the cybersecurity risk of the client computing systems, and/or potential remediations that may exist to improve the cybersecurity of the computing systems.

SUMMARY

In one or more embodiments, the disclosed systems, methods, and media include utilizing a crosswalk algorithm to identify controls (e.g., cybersecurity controls) across frameworks, and for utilizing identified controls to generate cybersecurity risk assessments. Specifically, a process, e.g., a cybersecurity module of a cybersecurity system, may generate one or more data structures that store a mapping between (1) information associated with devices (e.g., client devices, platforms, etc.) and/or software (e.g., applications), and (2) one or more controls (e.g., cybersecurity controls) of one or more frameworks.

For example, the information may be characteristic information that describes one or more characteristics of the devices and/or software utilized by an organization that offers one or more products and/or services. The cybersecurity module may utilize the characteristic information, that may be intrinsically linked to the devices and/or software, to generate a static mapping data structure that maps the characteristic information to one or more controls of one or more frameworks. In addition or alternatively, the cybersecurity module may utilize scan data (e.g., vulnerability scan data), generated based on a scan of the devices and/or software, to generate a dynamic mapping data structure that maps the scan data to one or more controls of one or more frameworks.

In an embodiment, the cybersecurity module may implement a crosswalk algorithm, utilizing a natural language processing (NLP)/machine learning (ML) unit, to update the dynamic mapping data structure to include one or more additional controls of one or more different frameworks. By implementing the crosswalk algorithm, the cybersecurity module may identify a more robust set of controls from the dynamic mapping data structure, and the robust set of controls make be utilized to generate cybersecurity information as will be described in further detail below. Advantageously, a user of the organization does not have to manually analyze the scan results, which may be in terse syntax, to identify the one or more additional controls of the one or more different frameworks. Additionally, and because the one or more additional controls can be identified utilizing the crosswalk algorithm according to the one or more embodiments described herein, the one or more additional controls can be utilized to obtain a better understanding of the cybersecurity risk and/or potential remediations to improve the cybersecurity of the computing systems. As such, the one or more embodiments described herein provide an improvement in the technological field of cybersecurity and can also provide an improvement to the computing systems themselves by improving the cybersecurity of the computing systems.

In an embodiment, a user, e.g., authorized user of an organization, may initiate an integration run to understand and assess the cybersecurity posture and/or cybersecurity risk associated with the devices and/or software associated with, for example, the organization. Based on the initiation, a risk of interest to be evaluated/assessed may be determined and the cybersecurity module may identify one or more controls, e.g., cybersecurity controls, related to the risk of interest.

The risk of interest may be defined in any of a variety of different ways such that the evaluation/assessment can be uniquely tailored for different organizations that may have different needs/desires, are in different sectors, are different sizes, utilize different types of devices/software, offer different products/services, etc. In an implementation, the risk of interest for an organization may be stored in a risk register that may, for example, be dedicated to the organization. As such, different organizations may each have their own risk register that may be modified and utilized by the cybersecurity module to perform cybersecurity evaluations/assessments as described herein. In an embodiment, the controls may be identified utilizing the generated data structures, e.g., static mapping data structure and/or dynamic mapping data structure.

In an implementation, the cybersecurity module may utilize the defined risk of interest, of the risk register, with the identified controls to perform the cybersecurity risk evaluation/assessment to generate cybersecurity information. For example, the evaluation/assessment may determine if devices and/or applications of the organization, that are related to the defined risk of interest, are compliant, non-compliant, or partially compliant with each of the one or more identified controls that are related to the defined risk of interest. The cybersecurity module may generate a risk score that indicates a level of cybersecurity risk for the defined risk of interest based on the determined compliance status for each of the identified controls.

Because the cybersecurity information (e.g., risk score) can be generated on-demand, e.g., real-time or near real-time, based on the identified controls, the organization may learn/determine its cybersecurity posture at different times. For example, a risk evaluation/assessment may be initially performed at a point in time to generate a risk score for a risk of interest, and an organization may learn/determine the level of risk for the risk of interest for this point in time based on the risk score. Additionally, a different risk evaluation/assessment may be again performed at a later point in time to generate a different risk score for the same risk of interest, and the organization may learn/determine the level of risk for the same risk of interest for the later point in time based on the risk score. As such, the organization may understand the changing risk posture of its device and/or software at different times for a single risk of interest. Therefore, and according to the one or more embodiments described herein, the cybersecurity module can provide an organization with up-to-date cybersecurity information regarding the organizations' cybersecurity posture that may change over time. As such, the one or more embodiments described herein provide an improvement in the technological field of cybersecurity.

In an embodiment, one or more remediations may be determined based on the performed evaluation/assessment, where the remediations may indicate how the cybersecurity posture/risk of the devices and/or software may improve. For example, if performance of the evaluation/assessment is based on an identified control being non-compliant, a remediation may indicate modifications to be implemented for the devices and/or software such that the risk score decreases and the cybersecurity risk lessens, i.e., improves. In an embodiment, the cybersecurity module 118 may access the devices and/or software, via a computer network, to validate whether the remediations have been implemented to improve the cybersecurity of the devices and/or software. By improving the cybersecurity of the devise and/or software through implementation of the determined remediations as described herein, the one or more embodiments described herein provide an improvement in the technological field of cybersecurity and can also provide an improvement to the computing systems themselves.

BRIEF DESCRIPTION OF THE DRAWINGS

The description below refers to the accompanying drawings, of which:

FIG. 2 is an exemplary static mapping data structure that stores a static mapping/association between characteristic information and one or more controls of one or more frameworks according to the one or more embodiments described herein;

FIG. 7 is an example data structure 700 that stores an association between one or more remediations and one or more controls according to the one or more embodiments described herein.

DETAILED DESCRIPTION OF AN
ILLUSTRATIVE EMBODIMENT

Figure 1:
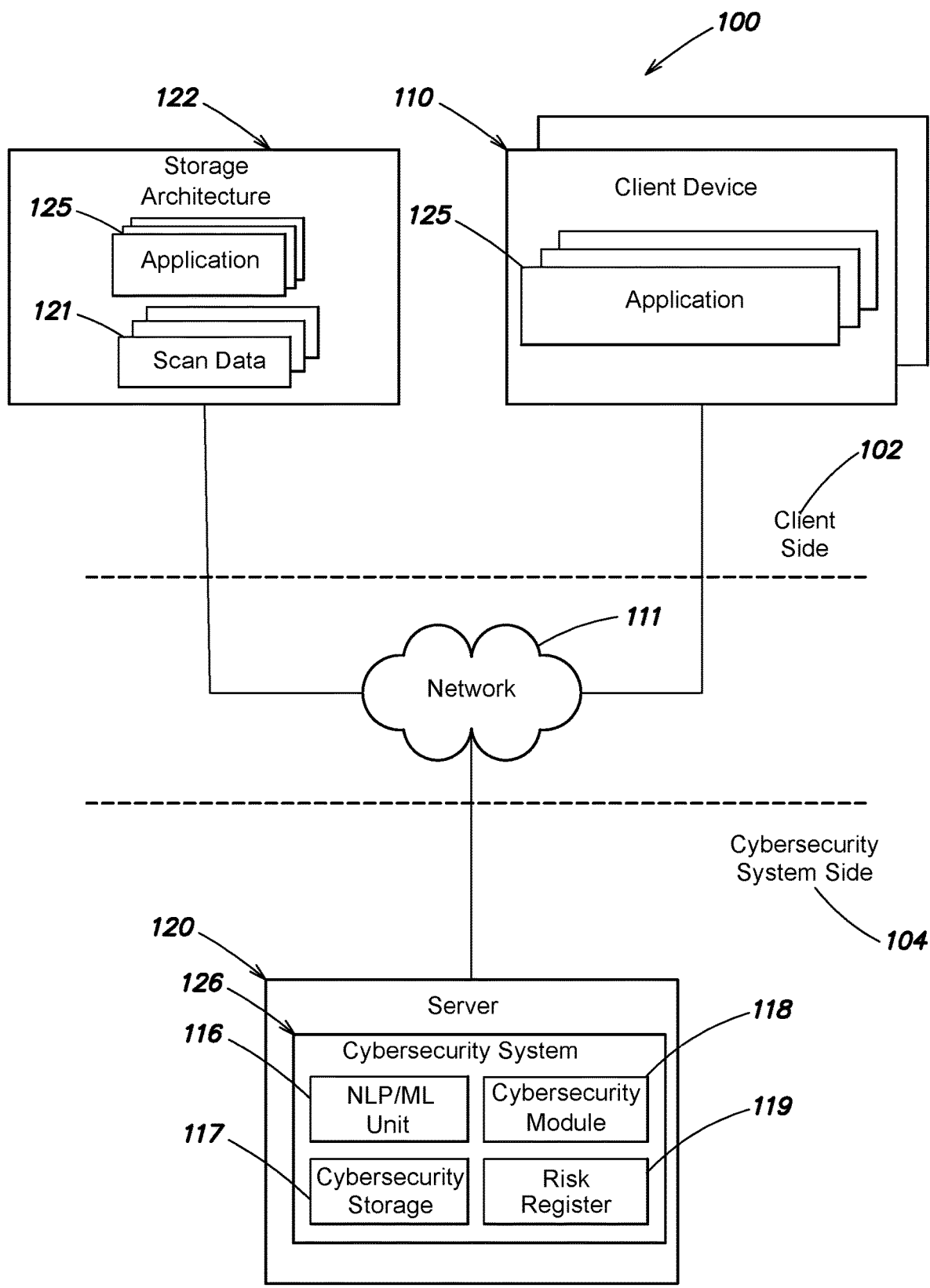
FIG. 1 is a high-level block diagram of an example architecture for utilizing a crosswalk algorithm to identify controls, across security frameworks, that are used to generate cybersecurity risk assessments according to the one or more embodiments described herein.

FIG. 1 is a high-level block diagram of an example architecture 100 for utilizing a crosswalk algorithm to identify controls, across security frameworks, that are used to generate cybersecurity risk assessments according to the one or more embodiments described herein. The architecture 100 may be divided into a client side 102 that includes one or more local client devices 110 and storage architecture 122 that are local to an end-user, and a cybersecurity system side 104 that includes a server 120 that is remote from the end-user and that are accessible to the end-user via a network 111 (e.g., the Internet). Each computing device, e.g., one or more local client devices 110, storage architecture 122, and server 120, may include processors, memory/storage, a display screen, and other hardware (not shown) for executing software, storing data and/or displaying information. In an implementation, server 120 may be a cloud-based server, i.e., one or more cloud-based devices.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. In an embodiment, the client device 110 may be a server, a workstation, a platform, a mobile device, a network host, or any other type of computing device. The client device 110 may store and execute one or more applications 125. In an implementation, the applications 125 may include, but are not limited to, software applications that may perform one or more different functions for an organization, e.g., authorized users of the organization, that operate the client devices 110. For example, a banking institution may be an organization and authorized end-users of the banking institution may operate client devices 110, and the application 125 may be banking applications that execute on client devices 110 that are utilized by the authorized end-users to performing banking functions.

The storage architecture 122 on client side 102 can be any of a variety of different types of storage. For example, the storage architecture may include, but is not limited to, cloud storage, databases, applications, application program interfaces (APIs), the Internet of Things (IoT) storage, hard disk drives, solid state drives, etc. In an implementation, the storage architecture may store/host applications 125 associated with the client device 110. Continuing with the example of a banking institution, the storage architecture 122 may be cloud-based storage and the cloud storage may host the banking applications that are operated and utilized by the end users of banking institution, e.g., the end user operating the client device 100 may utilize the banking application hosted on the cloud-based storage.

Additionally, the storage architecture 122 may store scan data 121. Scan data 121 may, for example, be generated based on the performance of one or more scans of client devices 110 and/or applications 125. In an implementation, the scan may be a vulnerability scan of client devices 110 and/or applications 125 that may evaluate one or more flaws or vulnerabilities associated with client devices 110 and/or applications 125. As such, scan data 121 may be generated based on the scan and may describe one or more vulnerabilities associated with the client devices 110 and/or applications 125.

For example, a host-based scanner may perform a scan to generate scan data 121 that locates and identifies vulnerabilities in servers, workstations, platforms, and/or other network hosts, and indicates configuration settings and/or patch history of scanned systems. In addition or alternatively, an application-based scanner may perform a scan to generate scan data 121 that indicates software vulnerabilities and erroneous configurations in applications 125 (e.g., network or web applications). In addition, any of a variety of different type of scans may be performed to generate scan data 121 that indicates vulnerability and/or characteristics associated with client device 110 and/or application 125.

The server 120 may store and execute cybersecurity system 126 that may implement the one or more embodiments described herein. In an implementation, the cybersecurity system 126 is an application, i.e., software. The cybersecurity system 126 may include a natural language processing (NLP)/machine learning (ML) unit 116, cybersecurity module 118, cybersecurity storage 117, and risk register 119. Cybersecurity module 118 may utilize data to identify one or more corresponding controls of one or more frameworks, e.g., cybersecurity frameworks, according to the one or more embodiments described herein and as described in further detail below. In an embodiment, the frameworks may include, but are not limited to, National Institute of Standards and Technology (NIST) 800-53-Rev. 5, Cybersecurity Framework (CSF), The Financial Services Sector (FSS) CSF, The Federal Financial Institutions Examination Council's Cybersecurity Assessment (FFIEC), Pipeline Transportation Security Administration (TSA) Security Guidelines, The Payment Card Industry Data Security Standard (PCI DSS) 3.2.1, International Organization for Standardization/International Electrotechnical Commission (ISO/IEC) 27002, IEC 62443 4-1, CMMC L3, The Health Insurance Portability and Accountability Act (HIPAA) Security Rule, Center for Internet Security (CIS), each of which are hereby incorporated by reference.

In an implementation, the cybersecurity module 118 may index into a static mapping data structure 200 (e.g., table) of FIG. 2 utilizing information, e.g., characteristic information, describing the client device 110 and/or applications 125 to identify one or more corresponding controls of one or more frameworks as will be described in further detail below and in accordance with one or more embodiments described herein. In an implementation, the characteristic information may include, but is not limited to, attributes, policies, configurations, etc. of the client device 110 and/or applications 125.

In addition or alternatively, the cybersecurity module 118 may index into a dynamic mapping data structure 300 (e.g., table) of FIG. 3 utilizing scan data 121 (e.g., vulnerability scan data) to identify one or more corresponding controls of one or more frameworks as will be described in further detail below and according to one or more embodiments described herein. In an implementation, NLP/ML unit 116 may generate the dynamic mapping data structure 300 as will be described in further detail below and according to the one or more embodiments described herein. The cybersecurity storage 117 may store static mapping data structure 200, dynamic mapping data structure 300, risk register 119, and/or additional data/information generated and/or obtained according to the one or more embodiments described herein. In an implementation, cybersecurity storage 117 may be a database (e.g., relational database), persistent storage, etc.

In response to the identification of one or more controls, the cybersecurity module 118 can generate/determine cybersecurity information (i.e., generate risk assessment information) related to the controls of the frameworks such that a user of the client device 110 may understand the cybersecurity posture and/or risk associated with client device 110 and/or applications 125 as will be described in further detail below and according to one or more embodiments described herein. In an implementation, risk register 119 may be utilized to generate the risk assessment information and may further store the generated risk assessment information.

The cybersecurity module 118 may, based on the identification of the one or more controls of a framework, crosswalk across one or more different frameworks to identify other related controls according to the one or more embodiments described herein and as described in further detail below. In an implementation, the dynamic mapping data structure 300 may be updated to include the other related controls according to the one or more embodiments described herein. By automatically, i.e., without user intervention, identifying the related controls of the different frameworks, the cybersecurity module 118 can port/map the cybersecurity information (e.g., compliance data) generated for the identified controls from one standard, i.e., framework, to the related controls of the different standard. As such, a more complete and robust set of controls, e.g., cybersecurity controls, can be identified that may be applicable to the client device 110 and/or applications 125, thus allowing for the generation of more complete and robust cybersecurity information related to the client device 110 and/or applications 125. As such, the one or more embodiments described herein provide an improvement in the technological field of cybersecurity. Specifically, the one or more embodiments described herein provide an improvement in the technology of cybersecurity by identifying related controls based on the implementation of the crosswalk algorithm and generating more robust cybersecurity information such that a more complete or better understanding of the cybersecurity posture and/or risk associated with the client device and/or application 125 can be determined. By having a complete and/or better understanding of the cybersecurity posture and/or risk, cybersecurity remediations can be implemented to improve the cybersecurity of the client device 110 and/or applications 125, and accordingly the one or more embodiments describe herein provide a further improvement in the technological field of cybersecurity. Additional, and by improving the cybersecurity of the computer, e.g., client device 110, as described herein, the one or more embodiments described herein improve the computer, e.g., client device 110, itself.

In some embodiments, one or more of the cybersecurity system 126, cybersecurity module 118, NLP/ML unit 116, and risk register 119 may be implemented through one or more software modules, API calls, or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media.

In other embodiments, one or more of the cybersecurity system 126, cybersecurity module 118, NLP/ML unit 116, and risk register 119 may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

The cybersecurity module 118 may generate a static mapping data structure 200 and utilize the static mapping data structure 200 to identify one or more controls of one or more framework based on information, e.g., characteristic information, associated with the client device 110 and/or applications 125 (e.g., properties, policies, attributes, configurations, etc.).

FIG. 2 is an exemplary static mapping data structure 200 that stores a static mapping/association between characteristic information and one or more controls of one or more frameworks according to the one or more embodiments described herein. In an embodiment, the static mapping data structure 200 is in a JavaScript Object Notation (JSON) file format. In alternative embodiments, the static mapping data structure 200 may be in an of a variety of different formats that store an associate between configuration information and controls of one or more frameworks. In an implementation, the static mapping data structure 200 may be preconfigured and generated by cybersecurity module 118 and based on input provided by an authorized user of the cybersecurity system 126 and/or client device 110.

As depicted in FIG. 2, sections 201A-C of static mapping data structure 200 may each store particular characteristic information describing one or more characteristics of a client device 110 and/or applications 125. Additionally, sections 202A-C of static mapping data structure 200 may each store particular information identifying one or more controls of one or more frameworks that correspond to the characteristic information stored in sections 201A-C of the static mapping data structure 200. Specifically, there may be particular characteristics of a client device 110 and/or application 125 that may be intrinsically or necessarily linked/associated with a corresponding control. As such, the static mapping data structure 200 may store a mapping between different characteristic information of a client device 110 and/or applications 125 and the intrinsically linked controls.

Therefore, and when information describing characteristics of client device 110 and/or applications 125 is provided/obtained to the cybersecurity system 126, the characteristic information may be utilized by the cybersecurity module 118 to index into static mapping data structure 200 to identify a section of 201A-C that stores matching or substantially matching characteristic information. The cybersecurity module 118 may then identify the corresponding control in a section of sections 202A-C.

For example, let it be assumed that the characteristic information indicates that an application 125 on client device 110 has a group policy object that includes information such as, but not limited to, that Active Directory is installed with elevated privileges being disabled. The cybersecurity module 118 may utilize this characteristic information to index into static mapping data structure 200 to identify section 201A that is substantially similar. As such, the cyber security module 118 may identify the control configuration management (CM)-6 (Configuration Settings) and access control (AC)-6 (Least Privilege) of NIST 800-53 (Rev. 5) in corresponding entry 202A. In an implementation, the static mapping data structure 200 may be updated by an authorized user (e.g., controller) of the cybersecurity system 126 and/or a user of the client device 110.

As will be described in further detail below, the identified controls, e.g., CM-6 and AC-6, can be utilized by the cybersecurity module 118 to generate/determine cybersecurity information, i.e., cybersecurity risk assessment information, related to the controls of the frameworks such that a user of the client device 110 may, for example, understand the cybersecurity (i.e., cybersecurity risks and/or posture) of the client device 110 and/or applications 125, and to also understand the different remediations that may be implemented to improve the cybersecurity.

In addition to identifying controls based on utilization of static mapping data structure 200, the cybersecurity module 118 may additionally or alternatively identify controls based on utilization of scan data 121 with dynamic mapping data structure 300.

Figure 3:
FIG. 3 is an exemplary dynamic mapping data structure that stores a mapping/association between scan data and one or more controls of one or more frameworks according to the one or more embodiments described herein.

FIG. 3 is an exemplary dynamic mapping data structure 300 that stores a mapping/association between scan data 121 and one or more controls of one or more frameworks according to the one or more embodiments described herein. In an embodiment, the dynamic mapping data structure 300 is in a JSON file format. In alternative embodiments, the dynamic mapping data structure 300 may be in an of a variety of different formats that store an associate between scan data 121 and controls of one or more frameworks. In an implementation, the dynamic mapping data structure 300 may be preconfigured and generated by cybersecurity module 118 and based on input provided by an authorized user of the cybersecurity system 126 and/or client device 110.

As an example, let it be assumed that based on a scan of client device 110 and/or applications 125, scan data 121 is generated that indicates the following:

REFERENCE:CVE-2009-2523:DESCRIPTION:Chain: product does not handle when an input string is not NULL terminated, leading to buffer over-read or heap-based buffer overflow.

As such, and based on a scan, the scan data 121 indicates a potential buffer overflow condition. A buffer overflow condition may be one of the primary causes of denial of service. However, denial of service may not be readily or easily ascertainable from the above "description" included in the scan data 121, i.e., denial of service is not intrinsically linked to the scan data 121. For example, the description above for the buffer overflow condition does not mention or indicate that denial of service may result from a buffer overflow condition.

As such, the buffer overflow condition may not be readily and/or easily linked to one or more controls that are related to denial of service. Therefore, and according to the one or more embodiments described herein, the dynamic mapping data structure 300 may be generated to link one or more conditions associated with the scan data 121 to one or more controls that are not readily/easily identifiable based on the scan data 121. Therefore, and when scan data 121 is generated, the scan data 121 may be utilized to index into the dynamic mapping data structure 300 to identify one or more corresponding controls.

In this example, the dynamic mapping data structure 300 may link the buffer overflow condition to one or more denial of service controls. Advantageously, when the scan data 121 indicates a buffer overflow condition, the cybersecurity module 118 may index into the dynamic mapping data structure 300 to identify the corresponding controls that are applicable to denial of service that may result from the buffer overflow condition, but that are not readily evident based on the scan data 121 itself.

Referring to FIG. 3, the dynamic mapping data structure 300 may include column 301 titled "language/keywords". Column 301 may include a plurality of entries each of which may store language and/or keywords associated with scan data 121 that may be generated based on a scan. Additionally, dynamic mapping data structure 300 may include column 302 titled "controls". Column 302 may include a plurality of entries each of which may store one or more controls that correspond to the language and/or keywords stored in column 301.

As such, and when scan data 121 is generated, the NLP/ML unit 116 may process scan data 121 and utilize NLP capabilities to identify language/keywords that are included in column 301 of dynamic mapping data structure 300. Based on a finding of a match or substantial match to language/keywords included in column 301, the cybersecurity module 118 may identify a corresponding control in column 302.

Continuing with the example where the scan data 121 indicates a buffer overflow condition, the NLP/ML unit 116 may process the scan data 121 and identify the language/keywords of "buffer overflow" utilizing NLP capabilities. As such, and in this example, the cybersecurity module 118 may identify the last entry of column 301 of dynamic mapping data structure 300 that substantially/similarly matches "buffer overflow". The cybersecurity module 118 may then identify control SC-5, of the last entry of column 302, that is related to denial of service which may result from a buffer overflow condition.

As such, and according to the one or more embodiments described herein, the dynamic mapping data structure 300 can be used, in addition or alternatively to the static mapping data structure 200, to identify one or more controls of more or more frameworks according to the one or more embodiments described herein. In an implementation, the dynamic mapping data structure 300 may be updated by an authorized user (e.g., controller) of the cybersecurity system 126 and/or a user of the client device 110. For example, machine learning capabilities of the NLP/ML unit 116 may be utilized to update the dynamic mapping data structure 300. For example, the dynamic mapping data structure 300 may be modified at one or more times utilizing machine learning capabilities and based on input/feedback from, for example, a user of client device 110 and/or input/feedback from an authorized user of the cybersecurity system 126.

In addition or alternatively, the dynamic mapping data structure may store an association/mapping between scan data 121 and one or more controls of one or more frameworks identified utilizing a crosswalk algorithm according to the one or more embodiments described herein. Specifically, and as will be described in further detail below, the cybersecurity module 118 may identify one or more controls of one or more frameworks in the dynamic mapping data structure 300 based on particular scan data 121. The cybersecurity module 118 may utilize a crosswalk algorithm to identify one or more different controls, of one or more different frameworks, that are related to the identified controls. The cybersecurity module 118 may update the dynamic mapping data structure 300 to store an association between the particular scan data 121 and the different controls identified utilizing the crosswalk algorithm.

Figure 4:
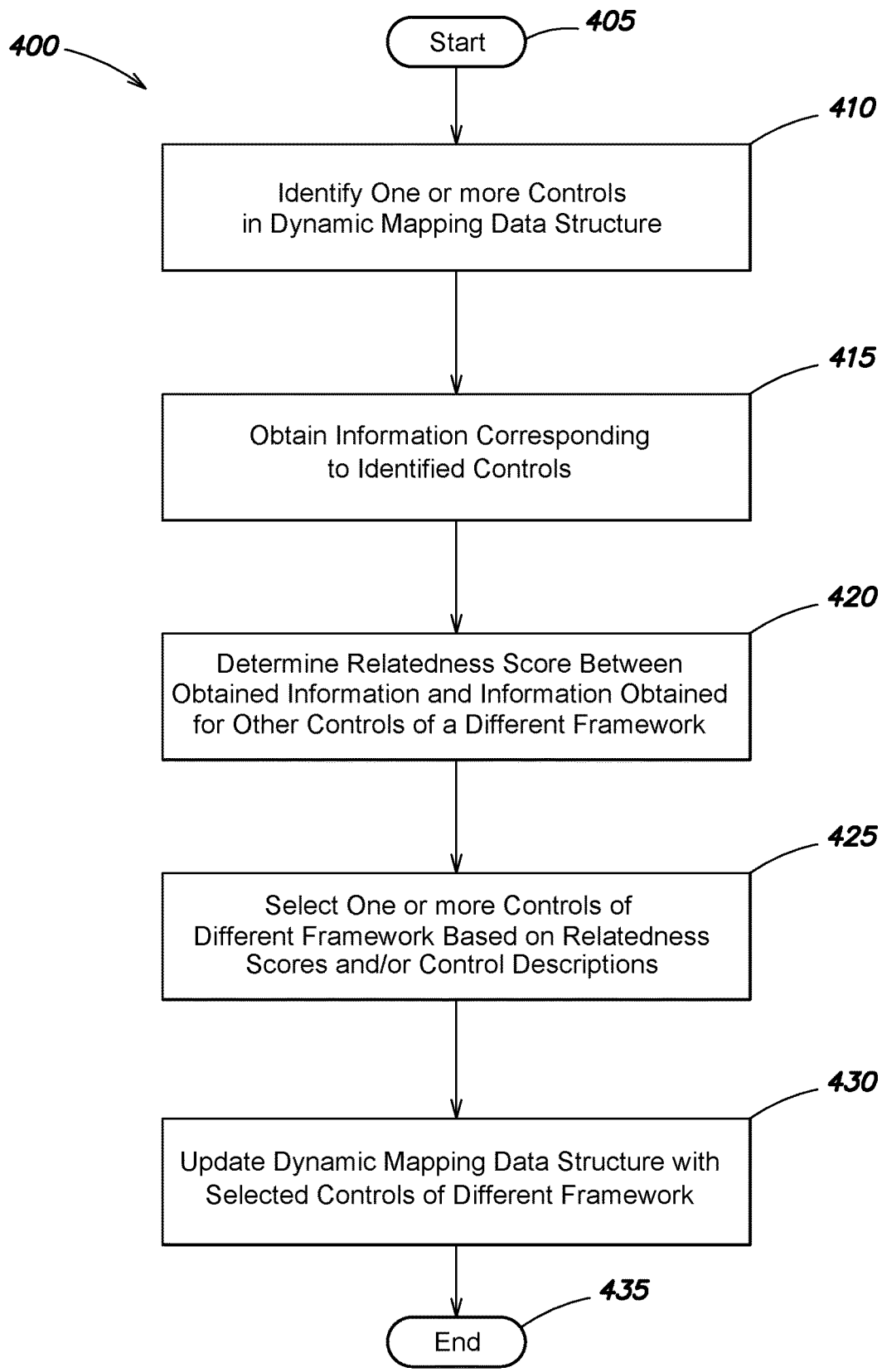
FIG. 4 is a schematic illustration of a flow diagram of an example method for utilizing a crosswalk algorithm to identify one or more controls, of one or more frameworks, that are related to controls identified in a dynamic mapping data structure according to the one or more embodiments described herein.

FIG. 4 is a schematic illustration of a flow diagram of an example method for utilizing a crosswalk algorithm to identify one or more controls, of one or more frameworks, that are related to controls identified in a dynamic mapping data structure according to one or more embodiments described herein. The procedure 400 starts at step 405 and continues to step 410 where the cybersecurity module 118 identifies one or more controls in dynamic mapping data structure 300.

For example, let it be assumed the cybersecurity module 118 identifies three different controls 1A, 1B, and 1C of a framework "A", in a dynamic mapping data structure as described above with reference to FIG. 3, based on particular scan data 121. The procedure continues to step 415 and the cybersecurity module 118 obtains information, e.g., control information, corresponding to the identified controls. For example, let it be assumed that the cybersecurity module 118 accesses one or more resources (external sources), e.g., online resources, databases, etc., to obtain a control description for each of the three controls, wherein the control descriptions respectively state:

1A. "The physical access to a property is guarded";

2A. "The WIFI password is kept secret within company"; and

3A. "Proper use authentication is performed when making changes".

The procedure continues to step 420 and NLP capabilities are utilized to determine a relatedness score between the control information for the controls in the dynamic mapping data structure 300 and information obtained for other controls of a different framework. For example, the cybersecurity module 118 may access one or more resources to obtain control descriptions for the other controls of the different framework. The NLP/ML unit 116 may determine a probability of relatedness between each of the descriptions of the three different controls and each of the control descriptions of each of the other controls of the different framework. For example, let it be assumed that a different framework "B" includes three other controls 1B, 2B, and 3B, with control descriptions that respectively state:

1B. "doors to the building are monitored";

2B. "remote internet access passcode not provided to visitors"; and

3B. "the system checks privileges before allowing modification".

The NLP/ML unit 116 may compare the control descriptions for the identified controls of framework "A" with the control descriptions for the controls of framework "B" to determine a relatedness score or value. Specifically, the NLP/ML unit 116 may utilize one or more dense neural networks, trained on varying security language constructs utilized in a variety of different frameworks. The NLP/ML unit 116 may utilize the trained neural networks with sentence-to-vector NLP tools to determine a probability of relatedness between control descriptions.

For example, and in an implementation, the NLP/ML unit 116 may be provided with (e.g., obtains) control descriptions from a plurality of different frameworks. For this example, the NLP/ML unit 116 is provided with (e.g., obtains) control descriptions of controls 1A, 2A, and 3A of framework "A" and control descriptions of controls 1B, 2B, and 3B of framework "B". In an embodiment, a control description may include one or more alphanumeric characters and/or symbols, where the particular alphanumeric characters and/or symbols may be concatenated together to form one or more words, phrases, etc.

The NLP/ML unit 116 may generate a combination for each unique pair of controls of two different frameworks. For this example, the NLP/ML unit 116 may generate a first combination for control 1A and control 1B, a second combination for control 1A and 2B, a third combination for control 1A and 3C, and so forth. Therefore, and in this example, the NLP/ML unit 116 generates 9 different combinations based on the 3 controls from each of frameworks "A" and "B".

The NLP/ML unit 116 may utilize one or more sentence-to-vector NLP tools with the control descriptions of each generated combination. For this example, and for the first generated combination, the NLP/ML unit 116 may utilize one or more known sentence-to-vector NLP tools to translate the control description of control 1A, e.g., "The physical access to a property is guarded", into a vector of values. That is, the one or more sentence-to-vector NLP tools may translate the words, characters, symbols, and/or phrases of the control description into one or more vector values. Similarly, the NLP/ML unit 116 may utilize one or more known sentence-to-vector NLP tools to translate the control description of control 1B, e.g., "doors to the building are monitored", into a vector of values. In an implementation, a same sentence-to-vector NLP tool is utilized for both control descriptions of a generated combination.

The NLP/ML unit 116 may provide the results (e.g., vectors of values generated for the two control descriptions of the generated pair) as input to one or more dense neural networks to generate a value, e.g., score, that represents a relatedness between the control descriptions. In an embodiment, the NLP/ML unit 116 may utilize supervised machine learning to configure/train the one or more dense neural networks such that the two vectors of values, generated from the two control descriptions, can be utilized by the one or more dense neural networks as input to generate a relatedness score as output. For example, training data may include different control descriptions (e.g., keywords, phrases, and/or symbols associated with securities/frameworks) and relatedness values/scores that can be utilized to train the dense neural networks according to the one or more embodiments described herein. Based on the training, two vectors of values representing two control descriptions can be utilized as input by the dense neural networks to generate a corresponding and accurate relatedness score as output.

In an implementation, the relatedness score output by the one or more dense neural networks indicates semantic similarities between the control descriptions of the generated pair, e.g., the semantic similarities between the words, phrases, and/or symbols of the two control descriptions. In an embodiment, the relatedness score is a value between 0 and 1, where a higher relatedness score, e.g., closer to 1, indicates or implies that the control descriptions have a higher probability of being semantically similar, while a lower relatedness score, e.g., closer to 0, indicates or implies that the control descriptions have a lower probability of being semantically similar. In an embodiment, the NLP/ML unit 116 may convert the generated relatedness score, e.g., a value from 0 to 1, to a percentage value.

For this example, let it be assumed that the NLP/ML unit 116 determines the following relatedness, i.e., semantic similarity, between the control description of framework "A" and framework "B" utilizing sentence-to-vector NLP tools and dense neural networks that are trained based on supervised machine learning:

TABLE 1

| Control Description of Framework "A" | Control Description of Framework "B" | Relatedness |
| --- | --- | --- |
| 3A. proper user authentication is performed when making system changes | 3B. the system checks privileges before allowing modification | 65% |
| 1A. the physical access to a property is properly guarded | 1B. doors to the building are monitored | 63% |
| 2A. the WIFI password is kept secret within company | 2B. remote internet access passcode not provided to visitors | 53% |
| 1A. the physical access to a property is properly guarded | 2B. remote internet access passcode not provided to visitors | 23% |
| 3A. proper user authentication is performed when making system changes | 2B. remote internet access passcode not provided to visitors | 7% |
| 2A. the WIFI password is kept secret within company | 1B. doors to the building are monitored | 5% |
| 1A. the physical access to a property is properly guarded | 3B. the system checks privileges before allowing modification | 2% |
| 3A. proper user authentication is performed when making system changes | 1B. doors to the building are monitored | 1% |
| 2A. the WIFI password is kept secret within company | 3B. the system checks privileges before allowing modification | 1% |

Although percentage values are used in this example for relatedness, it is expressly contemplated that a variety of different values or variables of any of a variety of different scales may be utilized for the relatedness scores.

The procedure continues to step 425 and the cybersecurity module 118 selects one or more controls of the different framework based on relatedness scores and/or control descriptions. In an embodiment, a user may evaluate the control descriptions of and/or the determined relatedness scores as depicted in Table 1 to select one or more controls of the different framework. For example, Table 1 as illustrated above may be displayed to a user on a computer display of client device 110. The user may then utilize the client device 110 to select one or more controls based on the evaluation. For example, the user may evaluate the relatedness scores and control description to determine that the control description of control 3B of framework "B" most closely relates to control 3A of framework "A" since the control descriptions for these controls have the highest is relatedness score of 65%. Based on this evaluation, the user may select control 3B by utilizing an input device, e.g., keyboard or mouse, of the client device 110 to select control 3B of framework "B". Alternatively, the user may utilize the client device 110 to select a plurality of controls of framework "B" based on the evaluation in a similar manner as described above. As such, a user can have the flexibility to select one or more controls based on an evaluation of the control descriptions and/or relatedness scores according to the one or more embodiments described herein.

In addition or alternatively, the cybersecurity module 118 may utilize the one or more determined relatedness scores with a threshold to identify one or more controls of the different framework. For this example, let it be assumed that the threshold value is 60%. As such, the cybersecurity module 118 may identify control 3B of framework "B" as being related to control 3A of framework "A" since the relatedness score of 65% is equal to or greater than the threshold value of 60%. Further, the cybersecurity module 118 may identify control 1B of framework "B" as being related to control 1A of framework "A" since the relatedness score of 63% is equal to or greater than the threshold value of 60%. As such, and according to the one or more embodiments described herein, any of a variety of different techniques may be utilized to select one or more controls of a different framework, e.g., framework "B", utilizing the generated relatedness score and based on execution of the crosswalk algorithm.

The procedure continues to step 430 and the cybersecurity module 118 updates the dynamic mapping data structure with the selected controls of the different framework. For this example, and because control 3B is determined as being related to control 3A, the cybersecurity module 118 may update the entries in column 302 that include control 3A to also include control 3B of framework "B". As such, and when the cybersecurity module 118 indexes into dynamic mapping data structure 300 utilizing scan data 121, the cybersecurity module may identify control 3A of framework "A" and also identify related controls of different frameworks, e.g., control 3B of framework "B".

Similarly, because control 1B is determined as being related to control 1A, the cybersecurity module 118 may update the entries of column 302 that include control 1A to also include control 1B of framework "B". As such, and when the cybersecurity module 118 indexes into dynamic mapping data structure 300 utilizing scan data 121, the cybersecurity module may identify control 1A of framework "A" and also identify related controls of different frameworks, e.g., control 1B of Framework "B".

Therefore, a more robust and complete set of controls across different frameworks may be identified according to the one or more embodiments described herein that provides an improvement in the technological field of cybersecurity. Because a more robust and complete set of controls are identified, e.g., controls 3B and 1B, and included in the dynamic mapping data structure 300, an organization may utilize the additional identified controls to improve the cybersecurity of devices and/or software as will be described in further detail below. The procedure ends at step 435.

According to the one or more embodiments described herein, the cybersecurity module may utilize the generated data structures, e.g., static mapping data structure 200 and dynamic mapping data structure 300, to generate/determine cybersecurity information (i.e., cybersecurity risk evaluation/assessment information) related to controls of one or more frameworks such that a user of the client device 110 may understand the cybersecurity posture and/or risk associated with client device 110 and/or applications 125 that, for example, may be operated by an organization as will be described in further detail below. In an embodiment, and as will described in further detail below, the risk register 119 may be utilized to generate the cybersecurity information.

Figure 5:
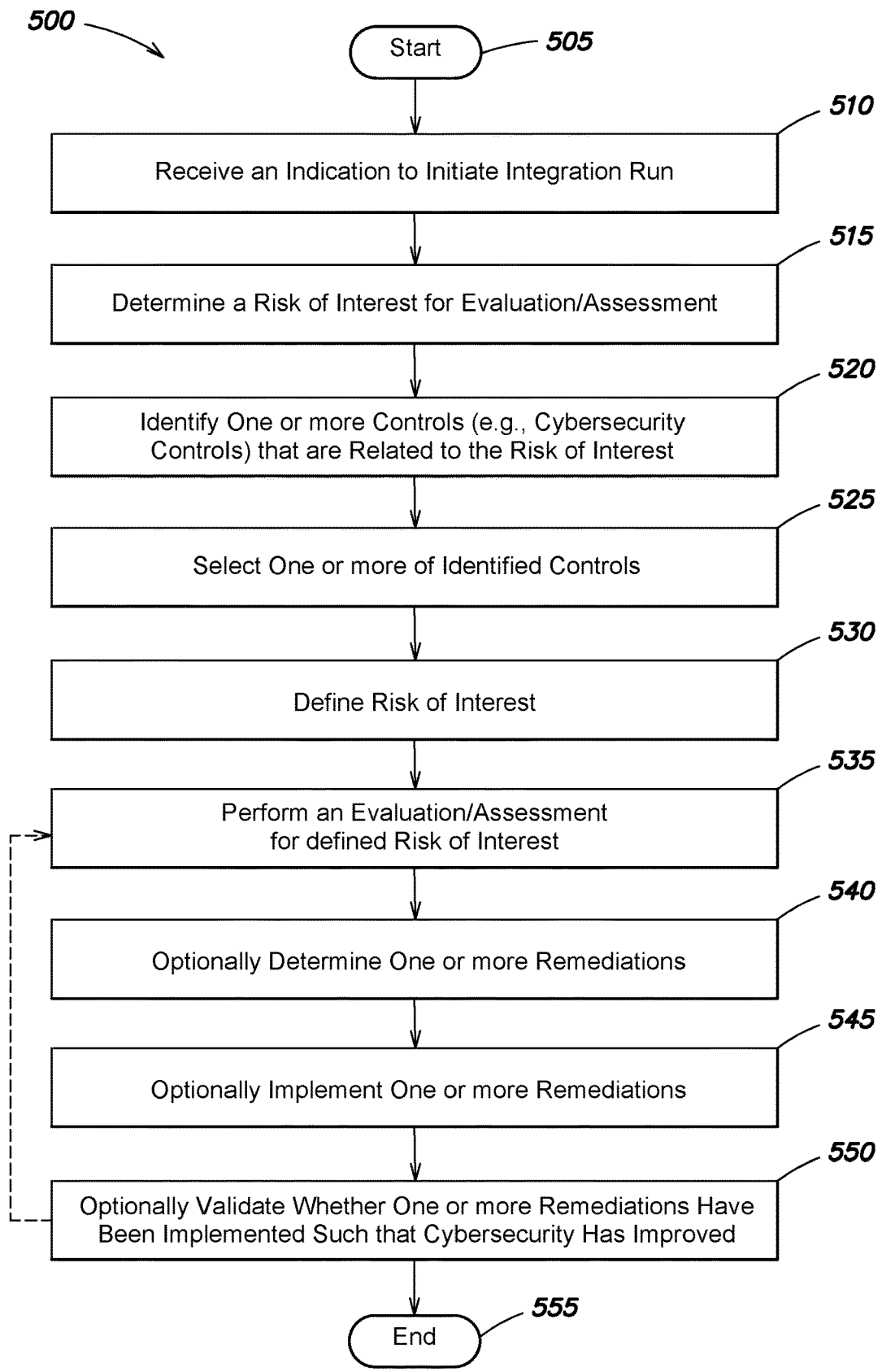
FIG. 5 is a schematic illustration of a flow diagram of an example method for generating cybersecurity information, based on the identification of one or more controls of one or more frameworks, according to the one or more embodiments described herein.

FIG. 5 is a schematic illustration of a flow diagram of an example method for generating cybersecurity information, based on the identification of one or more controls, according to the one or more embodiments described herein. In an implementation, the determined/generated cybersecurity information may indicate a current cybersecurity posture and/or current cybersecurity risk of the client device 110 and/or applications 125 that, for example, may be operated/controlled by an organization that is a customer of the cybersecurity system 126.

The procedure 500 starts at step 505 and continues to step 510 where the cybersecurity module 118 receives an indication to initiate an integration run. For example, a user, e.g., authorized user of an organization that may be a customer of the cybersecurity system 126, may first gain access to the cybersecurity system 126 in a conventional manner, e.g., first registering with the cybersecurity system 126 and then utilizing a username and password to access the cybersecurity system 126. The user, after gaining access, may utilize a client device 110, e.g., pointing device associated with the client device 110, to indicate in a user interface that an integration run is to be performed (i.e., executed) for software and/or devices. In this example, let it be assumed that user "A" gains access and initiates an integration run for application "Beta" operated by organization "X". In an embodiment, an integration run is a process or technique that is executed for evaluating/assessing the cybersecurity risk or posture for one or more client devices 110 and/or one or more applications 125 of interest, e.g., devise and/or software operated/controlled/owned by organization "X".

In an implementation, a single evaluation/assessment may be performed or executed for a single application or a single device. In an alternative implementation, a single evaluation/assessment may be performed or executed for a plurality of applications and/or devices, e.g., the evaluation/assessment may represent an overall aggregate cybersecurity risk or posture for the plurality of applications and/or devices.

At step 515, the cybersecurity module 118 determines a risk of interest for the evaluation/assessment. In an embodiment, the user may utilize the client device 110 to select the risk of interest via a user interface. A risk of interest may be based on one or more departments within a single organization. For example, "security misconfiguration" may be the risk of interest for an information technology (IT) department of organization "X", while the risk of interest may be the same or different for a compliance department or human resources department of organization "X". An evaluation/assessment for security misconfiguration risk may determine/quantify a level of risk associated with a security misconfiguration of software (e.g., application 125) and/or devices (e.g., client devices 110) that may lead to or result in a data leak/breach (e.g., data that may include personally identifiable information).

Alternatively, the cybersecurity module 118 may determine the risk of interest based on, for example, obtained organizational data (e.g., the type of organization, number of employees, etc.) as will be describe in further detail below with reference to the flow diagram of FIG. 8. In an implementation, a type of the organization and/or the applications 125 utilized by the organization may be utilized by the cybersecurity module 118 to determine the risk of interest. For example, and if the organization is a banking institution where personal information is often utilized, the cybersecurity module 118 may determine that "security misconfiguration" is a relevant risk of interest for the banking institution since a data leak of personally identifiable information may be of importance and a concern to the banking institution that manages personally identifiable information.

In addition or alternatively, the cybersecurity module 118 may evaluate data associated with and/or defines client devices 110 and/or application 125 of an organization, e.g., organization "X", to determine the risk of interest. Specifically the data may be obtained from client devices 110 and/or files associated with applications 125 that define the configurations, policies, and/or settings (e.g., characteristics) of the client devices 110 and/or applications. For example, if the obtained data is determined to be ransomware, the cybersecurity module 118 may determine that a ransomware risk should be evaluated/assessed, i.e., a ransomware risk is the risk of interest. Similarly, if the cybersecurity module 118 determines that the obtained data includes phishing data, the cybersecurity module 118 may determine that a phishing risk should be evaluated/assessed, i.e., a phishing risk is the risk of interest. As such, the risk of interest may be determined in any of a variety of different ways and utilizing any of a variety of different techniques and/or algorithms according to the one or more embodiments described herein.

For this example, let it be assumed that the risk of interest is "security misconfiguration" and that the evaluation/assessment is being performed for application "Beta" that is utilized by employees and/or customers of organization "X". As such, and in this example, the integration run is executed to evaluate/assess the "security misconfiguration" risk of application "Beta". Although the example describes a risk of interest for a single application for simplicity and ease of understanding, it is expressly contemplated that an integration run may be executed for a risk of interest that includes a plurality of applications, a plurality of devices, across platforms, etc.

The procedure continues to step 520 and one or more controls (e.g., cybersecurity controls) that are related to the risk of interest are identified. In an embodiment, the cybersecurity module 118 may utilize obtained data (e.g., characteristic information and/or scan data 121) to index into static mapping data structure 200 and/or dynamic mapping data structure 300 as described above to identify one or more controls that are related to security misconfiguration. Specifically, a user may utilize client device 110 to provide particular information (e.g., information describing characteristics of the client device 110 and/or applications 125) and/or scan data 121 to the cybersecurity module 118. The cybersecurity module may utilize the provided information to index into static mapping data structure 200 to identify one or more controls. In addition or alternatively, the cybersecurity module 118 may utilize the scan data 121 to index into the dynamic mapping data structure 300 to identify one or more controls.

In addition or alternatively, the cybersecurity module 118 may pull such information from client device 110 and/or storage architecture 122 via network 111 to identify the one or more controls. For example, and when the storage architecture 122 hosts one or more applications 125 and/or stores scan data 121 as previously described, the cybersecurity module 118 may access the storage architecture 122 via network 111 to obtain the scan data 121 and the information regarding the one or more applications 125. The cybersecurity module 118 may also access the client device 110 via network 111 to obtain information regarding the client device 110. The obtained information may be utilized to index into the static mapping data structure 200 and/or the scan data 121 may be utilized to index into the dynamic mapping data structure 300 to identify one or more controls as described above with reference to FIGS. 2 and 3.

In an implementation, if the obtained data is indicative of a setting for client device 110 and/or application 125, the setting may be utilized to index into the static mapping data structure 200 to identify one or more controls. In an implementation, if the obtained data is a misconfiguration that is identified based on a scan (e.g., vulnerability scan), the misconfiguration scan data may be utilized to index into the dynamic mapping data structure 300 to identify one or more controls. As such, the obtained data may be different types of data (e.g., settings and/or scan data), and the type of data may dictate whether the obtained data is utilized to index into the static mapping data structure 200 and/or the dynamic mapping data structure. Accordingly, and in an embodiment, obtained data that is determined/defined to be a type that is static data (e.g., a setting) may be utilized to index into a static mapping data structure 200, while obtained data that is determined to be a type that is dynamic data (e.g., from a scan) may be utilized to index into a dynamic mapping data structure.

In an implementation, static data is data that can be mapped directly because it is in a binary state, e.g., a setting is either on or off, cryptography is either set or cryptography is not set, session timeout is either 30 minutes or one hour, etc. This kind of data, i.e., static data, can be directly mapped to mandates within controls and is generally understood by those skilled in the art of information security. Examples of protocols that provide such mappings for static data include, but are not limited to, Security Content Automation protocol, Common Configuration Enumeration, etc.

In an implementation, dynamic data is data that is non-binary. For example, dynamic data may be a string that does not fit within the classification of a setting that is either on or off. Accordingly, NLP may be utilized with dynamic data to link the dynamic data, that may describe vulnerability or threat findings and the one or more controls that can mitigate such findings, as described herein.

Alternatively, the user may utilize the client device 110 to explicitly identify the one or more controls related to the risk of interest, e.g., security misconfiguration, utilizing the client device 110. In this example, let it be assumed that the identified controls that are related to security misconfiguration are: CM-2 (baseline configuration), CM-6 (configuration settings), and CM-8 (information system component inventory).

As another example where the risk of interest is a phishing risk, the identified controls may be security awareness training (AT)-2, of the NIST Cybersecurity Framework, that provides for security and privacy literacy training to system users, e.g., managers, senior executives, and contractors that operate the client devices 110 and/or applications 125 of organization "X". AT-2 may, for example, be "managed" by the human resources department of organization "X" since it relates to training. Additionally, system and information integration (SI)-4 and SI-3 of the NIST Cybersecurity Framework may also be identified controls for the phishing risk. In this example, these controls may be associated with the IT department of organization "X" that, for example, "manages" the software that is utilized to monitor for malicious emails. Therefore, in this example, the three controls, e.g., AT-2, SI-4, and SI-3, identified for the phishing risk may traverse a plurality of departments in a single organization, e.g., organization "X", according to the one or more embodiments described herein.

The procedure continues to step 525 and one or more of the identified controls are selected. For example, the user may utilize the client device 110 to select one or more identified controls via the user interface. Alternatively, the cybersecurity module 118 may automatically select one or more of the identified controls. For example, and based on the risk of interest, there may be a "security group" that mitigates the risk of interest. For example, and for security misconfiguration, the security group may be CM-2, CM-6, and CM-8. The controls of the security group may, for example, be provided for display on the client device 110, e.g., as a pop-up message or in a new window, as suggestions. The user may then utilize the client device to select one or more controls of the security group. In this example, let it be assumed that all the controls, e.g., CM-2, CM-6, and CM-8, are selected.

The procedure continues to step 530 and the risk of interest is defined. In this example, security misconfiguration, which is the risk of interest, is defined. In an embodiment, the user may utilize the client device 110 to define the risk of interest. For example, the user may utilize the client device 110 to define the risk of interest via a user interface. Alternatively, the cybersecurity module 118 may define the risk of interest utilizing a preconfigured or predefined definition for the risk of interest that, for example, may be stored on cybersecurity storage 117. For example, a user (e.g., authorized user) of the cybersecurity system 126 may predefine one or more risks of interest utilizing a computing device such that when a risk of interest needs to be defined for a customer, the predefined risk of interest may be accessed from the cybersecurity storage 117 and utilized as the defined the risk of interest.

For example, let it be assumed that the security misconfiguration risk for is organization "X" is defined with the following parameters:
  If encryption is not enabled for application "Beta", then application "Beta" is determined to be non-compliant with (i.e., fails for) CM-2 and CM-6;
  If a configuration file for application "Beta" does not exist for all baseline configurations utilized in the past 5 years, then application "Beta" is determined to be non-compliant with (fails for) CM-2;
  If an alert is not generated for IT personnel when an unauthorized change is made to a configuration setting for application "Beta", then application "Beta" is determined to be non-compliant with (fails for) CM-6; and
  If centralized inventory for organization "X" does not include a version number for each instance of application "Beta" installed on a device owned by organization "X", then application "Beta" is determined to be non-compliant with (fails for) CM-8.

The particular organization or a different organization may define the risk in any of a variety of different ways such that the definition of the risk of interest can change over time. Therefore, and in an implementation, a risk of interest, e.g., cybersecurity risk, may be defined in any of a variety of different ways utilizing any of a variety parameters/factors associated with, for example, the controls identified for the risk of interest. For example, the security misconfiguration risk, defined based on the parameters above, may be defined differently for a different organization utilizing different parameters, where the different organization may have different procedures, protocols, functions, services, departments, etc. Because the risk, e.g., cybersecurity risk, may be uniquely defined for different organizations, the one or more embodiments described herein provide an improvement in the field of cybersecurity technology since the uniquely defined risk can be used to perform unique risk assessments/evaluations, on-demand, as will be described in further detail below. As such, the example as described herein for defining the risk of security misconfiguration for application "Beta" of organization "X" should be taken for illustrative purposes only. In an embodiment, the defined risk may be stored in the risk register 119 and/or cybersecurity storage 117.

With the risk, e.g., security misconfiguration risk, defined, the procedure continues to step 535 and the cybersecurity module 118 performs an evaluation/assessment for the define risk of interest. In an embodiment, the evaluation/assessment of the risk may generate a risk score using the risk register 119 and based on analysis of the devices (client devices 110) and/or software (applications 125). In an implementation, the cybersecurity module 118 may access, via network 111, client devices 110 and/or applications 125 to obtain information (e.g., policies/settings/configuration information) associated with the client device 110 and/or applications 125. In addition or alternatively, the cybersecurity module 118 may obtain scan data 121 associated with client devices 110 and/or applications 125. The cybersecurity module 118 may perform a filtering process while or after obtaining the information and/or scan data 121. The cybersecurity module 118 may, utilizing the risk register 119, filter out (discard) information and/or scan data 121 that is not related to the defined risk and identify (e.g., retain and utilize) the information and/or scan data 121 that is related to the defined risk.

By performing the filtering process, the one or more embodiments described herein provide an improvement to the computer itself. Specifically, and by performing the filtering process, storage (e.g., cybersecurity storage 117) and processing resources of the cybersecurity system 126 are conserved. The cybersecurity module 118 may then perform the evaluation/assessment by generating or updating a risk score utilizing the retained information and/or retained scan data 121 with the parameters of the defined risk.

In this example for application "Beta" of organization "X", if the retained information and/or retained scan data 121 that is related to the risk of interest indicates that encryption is not enabled for application "Beta", the cybersecurity module 118 may determine that application "Beta" is non-compliant with CM-2 and CM-6. Additionally, if the retained information and/or the retained scan data 121 indicates that a centralized inventory for organization "X" includes a version number for each instance of application "Beta" installed on a device, the cybersecurity module 118 may determine that application "Beta" is compliant with CM-8.

The cybersecurity module 118 may determine a risk score on a risk scale for the evaluation/assessment based on the determination that application "Beta" is non-compliant with CM-2 and CM-6 and compliant with CM-8. For example, let it be assumed that the risk scale is from 0 to 25 where a value of 0 indicates no cybersecurity risk or a very low-level of cybersecurity risk, and a value of 25 indicates a high/severe level of cybersecurity risk. As such, and in this example, the cybersecurity module 118 may assign application "Beta" a risk score value of 16.67 (⅔*25) for the security misconfiguration risk since application "Beta" is determined to be non-compliant with 2 of the 3 controls.

As another example, let it be assumed that the retained information and/or retained scan data 121 that is related to the risk indicates that the application "Beta" is compliant with CM-2 (e.g., encryption is enabled and all configuration files for application "Beta" exist for all baseline configurations utilized in the past 5 years). Additionally, let it be assumed that the retained information and/or retained scan data 121 that is related to the risk indicates that application "Beta" is non-compliant with CM-6 (e.g., encryption is not enabled and/or an alert is not generated for IT personnel when an unauthorized change is made to a configuration setting for application "Beta"). Further let it be assumed that the retained information and/or retained scan data 121 that is related to the risk indicates that application "Beta" is compliant with CM-8 (e.g., centralized inventory includes a version number for each instance of application "Beta" installed on a device owned by organization "X").

Accordingly, and for this example, application "Beta" may be assigned a risk score value of 8.33 (⅓*25) for the security misconfiguration risk since application "Beta" is non-compliant with 1 of the 3 controls related to the risk of interest and application "Beta" is compliant with 2 of the 3 controls related to the risk of interest. As such, and in an embodiment, the risk score (i.e., overall risk score) may be based on the determined compliance status of each of the identified controls that are related to the risk of interest. Although reference is made of utilizing a scale from 0-25, it is expressly contemplated that any of a variety of different numerical, variable, etc. scales may be utilized as known by those skilled in the art to signify a level of risk. In an embodiment, the risk score may be a residual risk score that is based on a residual formula (i.e., algorithm). In an implementation, a residual risk score may be any risk score that is lowered based on a mitigation action. As such, if an inherent risk score is 25, and two controls are related to the risk that may reduce that risk, the residual formula may be—Residual Risk Score=Inherent/$1.5e^{average\ control\ score}$, where e is the natural log. Using this risk formula, that includes the natural log, lessens the residual risk score at a decreasing rate.

Although the example as described herein indicates that an identified risk is either compliant (e.g., passes) or non-compliant (e.g., fails), it is expressly contemplated that an identified risk may be partially compliant (e.g., partially pass) according to the one or more embodiments described herein to generate a risk score. For example, although the example above describes application "Beta" being either compliant or non-compliant with each of the identified controls related to the defined risk, it is expressly contemplated that the cybersecurity module 118 may assign a value, e.g., a numerical value, indicating a level of compliance for a control. For example, if a total of 10 configurations are required to be "set" for application "Beta" to be compliant with CM-2 and 7 of the 10 configurations are set, the cybersecurity module 118 may assign a value of 7 on a scale of 1-10 to indicate that application "Beta" is 70% (e.g., partially compliant) compliant with CM-2. The determination that application "Beta" is 70% compliant with CM-2 may then be utilized with the determined level of compliance for CM-6 and CM-8 to determine the overall risk score for the security misconfiguration risk that, in this example, includes CM-2, CM-6, and CM-8. As such, it is expressly contemplated that compliance or a level of compliance with one or more controls may be determined in any of a variety of different ways, and the level of compliance can then be utilized to generate the overall risk score for the defined risk of interest as described above and according to the one or more embodiments described herein.

The cybersecurity risk posture determined by the cybersecurity module 118 may then be provided to organization "X". For example, risk score and/or the individually determined compliance status for each of the identified controls related to the risk of interest may be provided over the network 111 for display on client device 110. As such, the authorized user "A" of organization "X" may understand the cybersecurity risk of its devices (e.g., client devices 110) and/or software (e.g., applications 125) as it relates to security misconfiguration based on the evaluation/assessment performed by the cybersecurity module 118 according to the one or more embodiments described herein.

Therefore, the one or more embodiments described herein provide an improvement in the technological field of cybersecurity by performing the risk evaluation/assessment and generating the risk score such that an organization can understand the cybersecurity risks of its devices and/or software. The procedure ends at step 540.

Figure 6:
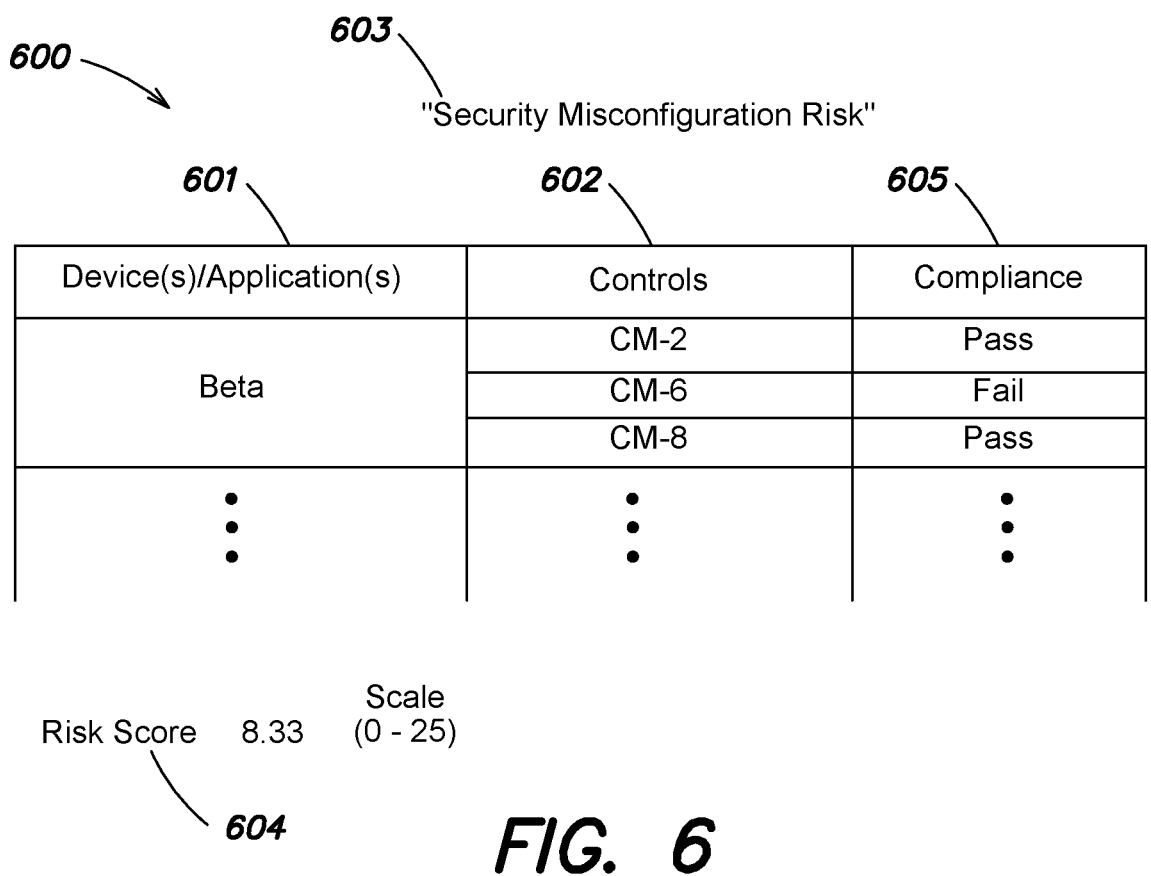
FIG. 6 is an example graphical interface 600 that is generated based on an evaluation/assessment for a defined risk of interest according to the one or more embodiments described herein.

FIG. 6 is an example graphical interface 600 that is generated based on an evaluation/assessment for a defined risk of interest according to the one or more embodiments described herein. As depicted in FIG. 6, header 603 identifies the defined risk of interest for the evaluation/assessment. In this example, the defined risk of interest identified in header 603 is "Security Misconfiguration Risk". Column 601, titled "device(s)/application(s)", identifies the devices and/or applications being evaluated/assessed for the integration run. In this example, the application being evaluated/assessed and identified in column 601 is application "Beta".

Column 602, titled "Controls", identifies the one or more controls that are related to the defined risk of interest. In this example, the controls related to the security misconfiguration risk and identified in column 602 are CM-2, CM-6, and CM-8. Column 605, titled "Compliance", indicates whether the device or application identified in column 601 is non-compliant, compliant, or partially compliant with the corresponding control. In this example, column 605 indicates that based on the performance of the evaluation/assessment as described above, application "Beta" is determined to be compliant with CM-2 and CM-8 as indicated by the term pass. Additionally, column 605 indicates that based on the performance of the evaluation/assessment, application "Beta" is determined to be non-compliant with CM-6 as indicated by the term fail. Although column 605 indicates that application "Beta" is determined to be compliant or non-compliant with a control, it is expressly contemplated that column 605 may indicate that an application or device is partially compliant (e.g., "partial pass") with a control according to the one or more embodiments described herein.

Further, the graphical user interface 600 may include risk score 604 that is generated based on the evaluation/assessment and may indicate an overall risk assessment for the defined risk of interest (e.g., security misconfiguration risk) that is collectively based on the related controls, e.g., CM-2, CM-6, and CM-8. In this example, the risk score is 8.33 on a scale from 0 to 25. The risk score is 8.33 since application "Beta" is compliant with CM-2 and CM-8 and non-compliant with CM-6. The risk score of 8.33 may indicate to a user that application "Beta" has a low/moderate level of security misconfiguration risk since the risk score is near but lower than the midpoint of the scale, e.g., 12.5. Had application "Beta" also been non-compliant with CM-2 and CM-8, the risk score may have been 25 indicating a high/severe level of cybersecurity risk. However, had applications "Beta" been compliant with CM-6, the risk score may have been 0 indicating no or a very low-level of cybersecurity risk.

In an implementation, the graphical interface 600 may be provided, from cybersecurity system 126 over network 111, for display on a display device (not shown) of client device 110. As such, an authorized user of, for example, an organization, e.g., organization "X", can view the evaluation/assessment for the defined risk of interest to understand the level of risk to determine if steps/remediations need to be implemented to improve cybersecurity, i.e., to lower the risk score to achieve a lower level of security misconfiguration risk for application "Beta". In this example, and because the risk score is 8.33 on a scale of 0 to 25, the user of the client device 110 may understand and conclude, for example, that the application "Beta" has a low/moderate level of cybersecurity risk as it relates to security misconfiguration that could lead to a data leak/breach. As such, the user may determine that remediations can be implemented for application "Beta" such that the chances of a data leak/breach due to a security misconfiguration are less likely.

In addition, the user of the client device 110 can also identify and understand the relationship between the controls related to the risk of interest and the application and/or device being evaluated/assessed. In this example, the user can utilize graphical interface 600 to understand that application "Beta" is non-compliant with CM-6 and compliant with CM-2 and CM-8. The relationship between application "Beta" and the controls that are related to the defined risk (e.g., compliance/non-compliance) may allow the user to better understand which controls require remediation to obtain improved cybersecurity.

Although the example with respect to FIG. 6 includes a single application for ease of understanding, it is expressly contemplated that the one or more embodiments described herein may perform a single risk evaluation/assessment for a plurality of applications 125, one or more devices (e.g., client device 110), one or more platforms (e.g., a plant, or a group of devices that are part of a platform), and/or other types of software. As such, the example of FIG. 6 is to be taken for illustratively purposes only. Advantageously, an organization, e.g., an authorized user of an organization, can obtain an on-demand (e.g., a real-time or near real-time) cybersecurity risk evaluation/assessment of its devices (client devices 110) and/or software (applications 125) based on a risk that, for example, may be uniquely defined based on the characteristics of the organization. As such, and by performing the on-demand risk evaluation/assessment by the cybersecurity module 118, the one or more embodiments described herein provide an improvement in the technological field of cybersecurity.

Referring back to FIG. 5 and after the cybersecurity risk evaluation/assessment is performed, the procedure optionally continues to step 540 and one or more remediations are determined. In an implementation, the one or more remediations may be determined for a non-compliant or partially compliant evaluation. In an embodiment, the cybersecurity module 118 may determine one or more remediations. For example, the cybersecurity module 118 may determine one or more settings, configurations, and/or policies for a device/application that is "compliant" with a control. The cybersecurity module 118 may compare the determined settings, configurations, and/or policies with the settings, configurations, and/or policies of the non-compliant or partially compliant device/application. Based on the comparison, the cybersecurity module 118 can determine which settings, configurations, and/or policies have to be "enabled" such that the non-compliant or partially compliant device/application changes to become compliant with the control.

Continuing with the example where application "Beta" is compliant with CM-2 and CM-8 and non-compliant with CM-6, the cybersecurity module 118 may determine one or more remediations that when implemented cause application "Beta" to become compliant with CM-6. In an embodiment, cybersecurity storage 117 may store a data structure that stores an association between one or more remediations and one or more controls. Specifically, the settings, configurations, and/or policies that are "enabled" for a device/application that is compliant with a control may be the remediations stored in the data structure for the corresponding control. For example, if application "Example" is compliant with control "CM-6", the cybersecurity module 118 may determine which relevant settings, configurations, and/or policies are enabled for application "Example", and then store the enabled settings, configurations, and/or polices in the data structure with the corresponding control, e.g., control "CM-6".

FIG. 7 is an example data structure 700 that stores an association between one or more remediations and one or more controls according to the one or more embodiments described herein. In an implementation, the cybersecurity module may index into data structure 700 utilizing an identifier of a control for which a device/application is determined to be "non-compliant" or "partially compliant" to identify one or more corresponding remediations. For this example, application "Beta" is only non-compliant with CM-6. Therefore, the cybersecurity module 118 may utilize the identifier of "CM-6" to index into data structure 700 to identify a matching entry in column 701 titled "Control". Based on the match, the cybersecurity module 118 may identify one or more corresponding remediations in column 702 titled "Remediation(s). In this example, the remediation for CM-6 is "Switch on one or more alerts for a designated event".

The one or more remediations identified in the data structure 700 may be provided from cybersecurity system 126 to client device 110 over network 111 such that, for example, the one or more remediations can be displayed on client device 110 to the authorized user such that the remediations that can be implemented to improve cybersecurity.

Referring back to FIG. 5, the procedure optionally continues to step 545 and the one or more remediations are implemented. For example, the user utilizing the client device 110 may implement the one or more remediations for application "Beta" such that application "Beta" becomes compliant with CM-6. In this example, the user may utilize the client device to modify a configuration file for application "Beta" to switch on a setting such that an alert is generated when a designated event (e.g., unauthorized change is made to a configuration setting for application "Beta") occurs. As such, and based on the modification to the configuration file, application "Beta" may become compliant with CM-6. Alternatively, the cybersecurity module 118 may access and modify the configuration file via network 111 such that an alert is generated when the designated event occurs.

Optionally, the procedure continues to step 550 and the cybersecurity module 118 validates whether the one or more remediations have been implemented such that the cybersecurity has improved. In an embodiment, the validation is performed by reverting to step 535 (as indicated by the dashed line) and again performing the evaluation/assessment for the defined risk utilizing the risk register as described above. For this example, the cybersecurity module 118 again performs the evaluation/assessment for the security misconfiguration risk and determines that application "Beta" is compliant with CM-2, CM-6, and CM-8. As such, the cybersecurity module 118 may generate a risk score of 0 indicating application "Beta" has no cybersecurity risk or a very low-level of cybersecurity risk for security misconfiguration. If the remediation is not implemented and application "Beta" is still not compliant with CM-6, the cybersecurity module 118 may generate the same risk score of 8.33 indicating application "Beta" has a low/moderate level of cybersecurity risk for security misconfiguration.

Because the cybersecurity of the client device 110 and/or applications 125 improve according to the one or more embodiments described herein, the one or more embodiments described herein improve the functioning of the client device 110 and/or applications 125 with respect to cybersecurity. Additionally, the one or more embodiments described herein provide an improvement in the technological field of cybersecurity. The procedure ends at step 555.

Figure 8:
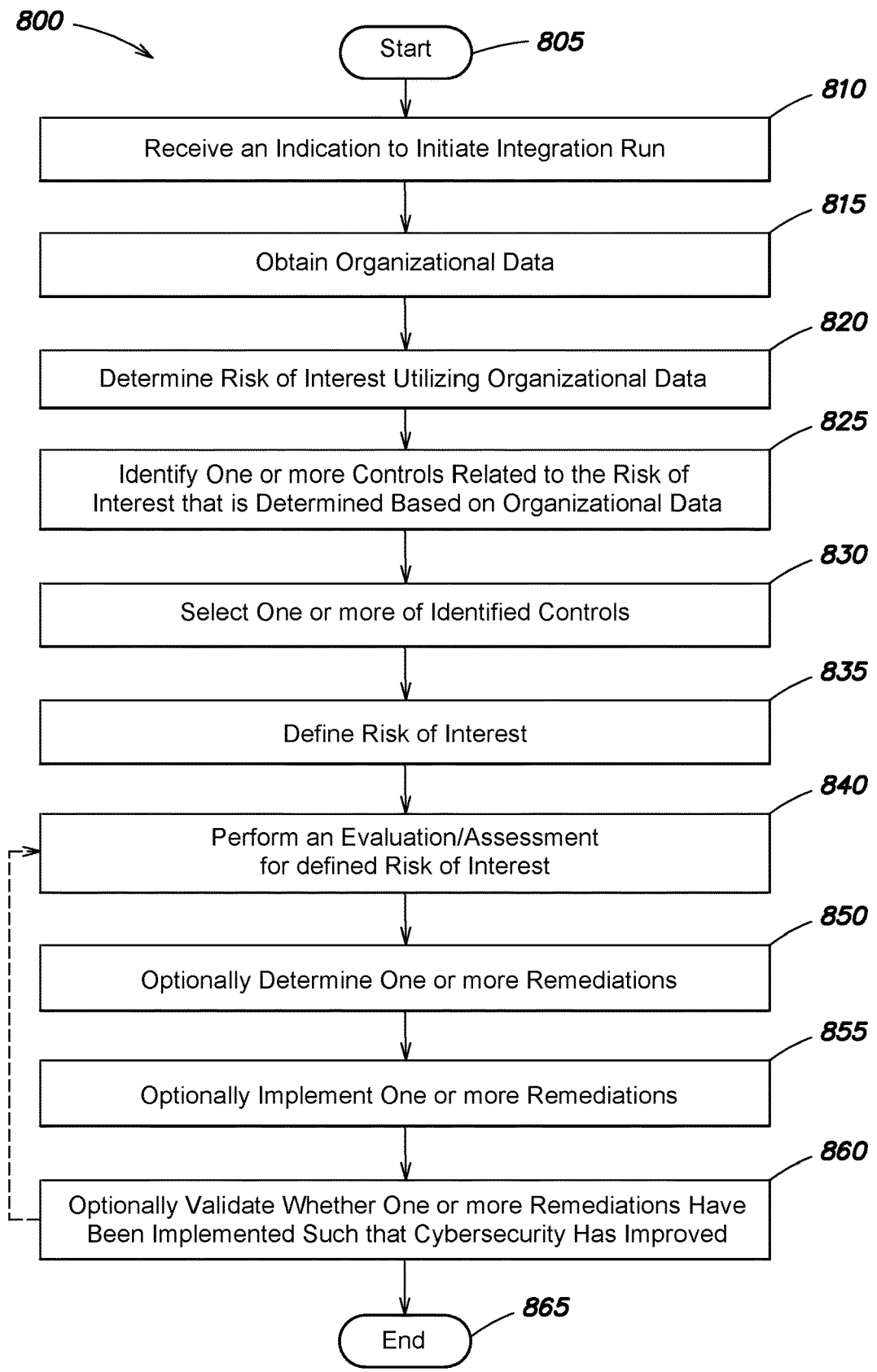
FIG. 8 is a schematic illustration of a flow diagram of an example method for generating cybersecurity information based on a risk of interest that is determined utilizing organizational data according to the one or more embodiments described herein.

FIG. 8 is a schematic illustration of a flow diagram of an example method for generating cybersecurity information based on a risk of interest that is determined utilizing organizational data according to the one or more embodiments described herein. The procedure 800 starts at step 805 and continues to step 810 where the cybersecurity module 118 receives an indication to initiate an integration run. For example, the indication may be received in a similar manner as described above with reference to step 510 of FIG. 5.

The procedure continues to step 815 and organizational data is obtained that defines one or more characteristics associated with an organization for which the integration run is being performed. For example, a user, e.g., authorized user of the organization that is a customer of the cybersecurity system 126, may utilize the client device 110 to provide the organizational data to the cybersecurity system 126 over network 111. Alternatively, the cybersecurity system 126, e.g., the cybersecurity module 118 of the cybersecurity system 126, may obtain, e.g., pull, the organizational data from the client device 110 and/or storage architecture 122.

For example, the organizational data may include, but is not limited to, a size of the organization (e.g., number of employees), one or more sectors that the organization operates in, one or more types of customers the organization has, location(s) of the organization, etc. In an implementation, the organizational data may define the organization and differentiate the organization from other organizations. As an example, let it be assumed that the organization is a pipeline company. As such, and for this example, the organizational data may include, but is not limited to, information indicating that the pipeline company is in the energy sector and specifically, is in the business of pipeline operation, management, and development. The organizational data may further indicate that the number of employees at the pipeline company is 850.

As a different example, let it be assumed that the organization is a municipality. As such, and for this different example, the organizational data may include, but is not limited to, information indicating that the municipality is in the emergency service sector (e.g., police department, fire department, etc.). The organizational data may further indicate that the number of employees at the municipality is 3,100. In an implementation, the organizational data may be stored on cybersecurity storage 117 with a unique identifier that identifies the organization.

The procedure continues to step 820, and the cybersecurity module 118 determines a risk of interest utilizing the organizational data. In an implementation, there may be risks that are applicable to all organizations across all sectors. For example, such risk of interests may include, but are not limited to, phishing attacks, data breach, ransomware attacks, malware attacks, etc. In addition or alternatively, there may be risk of interests that are applicable to one or more organizations of a particular sector, or a risk of interest may be applicable to an organization based on other organizational data, e.g., type of customers.

In an embodiment, the cybersecurity module 118 may access one or more external sources, e.g., databases, reports, online resources, etc. For example, the reports may be breach reports that include information indicating which organizations encounter breaches, types of breaches, number of breaches, etc. The cybersecurity module 118 may utilize the information from the reports to generate statistical information based on selected organizational information. For example, the cybersecurity module 118 may segregate the information of the reports based on sector to determine statistical information per sector. In an implementation, the statistical information may be different values or rates associated with a breach per sector.

For example, the rates may include, but are not limited to, percentage of attacks reported per sector, resistance strength (e.g., a measure of control effectiveness once an attack has begun), number of attempts via phishing per sector, number of malware attacks per sector, number of ransomware attacks per sector, click rate per sector, variance in attack types per sector, etc.

Continuing with the example of the pipeline company that is in the energy sector, the cybersecurity module 118 may identify those organizations within the reports that are in the energy sector and determine the statistical information for the energy sector. For example, the statistical information may indicate that organizations in the energy sector on average experience 20 phishing attacks per month, and that organizations in the energy sector on average experience 500 malware attacks per month, etc. The cybersecurity module 118 may similarly determine statistical information for the emergency service sector. Although the example describes utilizing a sector to determine statistical information for the sector, it is expressly contemplated that other organizational data may be utilized to determine the statistical information. For example, a threshold number of employees may be utilized to determine statistical information. As such, the cybersecurity module 118 may identify those organizations within the reports that have at least the threshold number of employees, and then determine the statistical information in a similar manner for organizations with at least the threshold number of employees.

In an embodiment, the cybersecurity module 118 may determines one or more monetary values for one or more different types of breaches. For example, the cybersecurity module 118 may utilize an external source, e.g., Ponemon Institute's Cost of a Data Breach Report, that may indicate the cost associated with a breach. In an embodiment, the cost may be based on a variety of factors such as, but not limited to, sector, company-size, etc. The cybersecurity module 118 may utilize the cost from the external source in conjunction with the statistical information, e.g., 500 ransomware attacks per month, to determine the risk of interest.

In this example, let it be assumed that the external source indicates that a ransomware attack that would result in a breach would cost an organization, e.g., pipeline company in the energy sector with 850 employees, $4.66 million. Additionally, let it be assumed that a phishing attempt that would result in a breach would cost the organization, e.g., pipeline company in the energy sector with 850 employees, less than $100,000.

Therefore, and in this example, the cybersecurity module 118 may determine that because organizations in the energy sector encounter, on average, a number of phishing attacks that is less than a threshold value (e.g., 20) and the expected cost based on a breach is less than a monetary threshold value (e.g., $1,000,000), that a phishing risk should not be a risk of interest to be evaluated for the pipeline company in the energy sector. The cybersecurity module may determine that because organizations in the energy sector encounter, on average, a number of ransomware attacks that is greater than a threshold value (e.g., 50) and the expected cost based on a breach is greater than a monetary threshold value (e.g., $2,000,000), that a ransomware risk should be a risk of interest to be evaluated for the pipeline company in the energy sector. As such, and according to the one or more embodiments described herein, the cybersecurity module may determine/identify a risk of interest based on a variety of different organizational data. For this example, the cybersecurity module 118 determines that a ransomware risk is the risk of interest to be evaluated/assessed for the pipeline company based on the statistical information and cost information that are determined from the organizational data of the pipeline company as described above.

The procedure continues to step 825, and one or more controls (cybersecurity controls) that are related to the risk of interest are identified. The one or more controls may be identified in a similar manner as described above with reference to step 520 of FIG. 5. For the example of the pipeline company where the risk of interest is a ransomware risk, the one or controls may include, but are not limited to, Identification and Authentication (IA)-2 through IA-11.

The procedure continues to step 830 and one or more of the identified controls are selected. For example, the one or more controls may be selected in a similar manner as described above with reference to step 525 of FIG. 5.

The procedure continues to step 835 and the risk of interest is defined. For example, the risk of interest may be defined in a similar manner as described above with reference to step 530 of FIG. 5. The procedure continues to step 840 and the cybersecurity module 118 performs an evaluation/assessment for the risk of interest. For example, the evaluation/assessment may be performed in a similar manner as described above with reference to step 535 of FIG. 5.

The procedure may optionally continue to step 850 and one or more remediations may be determined. For example, the one or more remediations may be determined as described above with reference to step 540 of FIG. 5. The procedure may optionally continue to step 855 and one or more remediations may be implemented. For example, the one or more remediations may be implemented as described above with reference to step 545 of FIG. 5. The procedure may optionally continue to step 860 and it may be validated whether the one or more remediations have been implemented such that cybersecurity has been improved. For example, validation may be performed as described above with reference to step 550 of FIG. 5, and the procedure may revert back to step 840 as indicated by dashed line. The procedure ends at step 865.

It is noted that, in some embodiments, one of the example methods shown in FIGS. 4, 5, and 8 may be performed, while in other embodiments, any combination of the three example methods shown in FIGS. 4, 5, and 8 may be performed.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities.

Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as client device 110, storage architecture 122, and/or server 120. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A cybersecurity system, comprising:
    a memory;
    a processor coupled to the memory;
    a cybersecurity software module executed by the processor, the cybersecurity software module configured to:
        identify one or more first cybersecurity controls stored within a dynamic mapping data structure, wherein the dynamic mapping data structure stores a mapping between scan data, generated based on a scan of one or more devices or one or more applications, and the one or more first cybersecurity controls of one or more first cybersecurity frameworks;
        obtain, from one or more sources that are different than the dynamic mapping data structure, first cybersecurity control information for each of the one or more first cybersecurity controls;
        obtain, from the one or more sources, second cybersecurity information for each of one or more second cybersecurity controls of one or more second cybersecurity frameworks that are different than the one or more first cybersecurity frameworks;
        generate, for each combination of the one or more first cybersecurity controls and the one or more second cybersecurity controls, a related score based on a comparison of the first cybersecurity control information and the second cybersecurity information;
        select a particular second cybersecurity control based on a particular relatedness score generated for a particular combination that includes the particular second cybersecurity control and a particular first cybersecurity control; and update the dynamic mapping data structure to include the particular second cybersecurity control, wherein particular scan data mapped to the particular first cybersecurity control in the data structure is also mapped to the particular second cybersecurity control in the data structure.

2. The cybersecurity system of claim 1, further comprising a natural language processor (NLP) configured to:

utilize one or more sentence-to-vector tools to translate the first cybersecurity control information, obtained for the particular first cybersecurity control, to a first vector of values; and utilize the one or more sentence-to-vector tools to translate the second cybersecurity control information, obtained for the particular second cybersecurity control, to a second vector of values.

3. The cybersecurity system of claim 2, further comprising one or more neural networks configured to:

receive, as input, the first vector of values and the second vector of values as input; and generate, as output, the particular relatedness score.

4. The cybersecurity system of claim 3, wherein the one or more neural networks are trained utilizing supervised machine learning with training data that includes training input cybersecurity control information and training output relatedness scores.

5. The cybersecurity system of claim 1, wherein the particular relatedness score indicates semantic similarities between the first cybersecurity control information of the particular first cybersecurity control and the second cybersecurity control information of the particular second cybersecurity control.

6. The cybersecurity system of claim 1, wherein the dynamic mapping data structure is updated to include the particular second cybersecurity control based on a determination that the particular relatedness score is greater than a threshold value.

7. The cybersecurity system of claim 1, wherein the dynamic mapping data structure is updated to include the particular second cybersecurity control based on receiving user input.

8. A method, comprising:

identifying, by a cybersecurity software module executed by a processor of a computing device, one or more first cybersecurity controls stored within a dynamic mapping data structure, wherein the dynamic mapping data structure stores a mapping between scan data, generated based on a scan of one or more devices or one or more applications, and the one or more first cybersecurity controls of one or more first cybersecurity frameworks;

obtaining, from one or more sources that are different than the dynamic mapping data structure, first cybersecurity control information for each of the one or more first cybersecurity controls;

obtaining, from the one or more sources, second cybersecurity information for each of one or more second cybersecurity controls of one or more second cybersecurity frameworks that are different than the one or more first cybersecurity frameworks;

generating, for each combination of the one or more first cybersecurity controls and the one or more second cybersecurity controls, a related score based on a comparison of the first cybersecurity control information and the second cybersecurity information;

selecting a particular second cybersecurity control based on a particular relatedness score generated for a particular combination that includes the particular second cybersecurity control and a particular first cybersecurity control; and updating, by the cybersecurity software module, the dynamic mapping data structure to include the particular second cybersecurity control, wherein particular scan data mapped to the particular first cybersecurity control in the data structure is also mapped to the particular second cybersecurity control in the data structure.

9. The method of claim 8, the method further comprising:

utilizing, by a natural language processor (NLP), one or more sentence-to-vector tools to translate the first cybersecurity control information, obtained for the particular first cybersecurity control, to a first vector of values; and utilizing, by the NLP, the one or more sentence-to-vector tools to translate the second cybersecurity control information, obtained for the particular second cybersecurity control, to a second vector of values.

10. The method of claim 9, the method further comprising:

receiving, as input by one or more neural networks, the first vector of values and the second vector of values as input; and generating, as output by the one or more neural networks, the particular relatedness score.

11. The method of claim 10, wherein the one or more neural networks are trained utilizing supervised machine learning with training data that includes training input cybersecurity control information and training output relatedness scores.

12. The method of claim 8, wherein the particular relatedness score indicates semantic similarities between the first cybersecurity control information of the particular first cybersecurity control and the second cybersecurity control information of the particular second cybersecurity control.

13. The method of claim 8, wherein the dynamic mapping data structure is updated to include the particular second cybersecurity control based on a determination that the particular relatedness score is greater than a threshold value.

14. The method of claim 8, wherein the dynamic mapping data structure is updated to include the particular second cybersecurity control based on receiving user input.

15. One or more non-transitory computer-readable media, having stored thereon instructions that when executed by a computing device, cause the computing device to perform operations comprising:

identifying one or more first cybersecurity controls stored within a dynamic mapping data structure, wherein the dynamic mapping data structure stores a mapping between scan data, generated based on a scan of one or more devices or one or more applications, and the one or more first cybersecurity controls of one or more first cybersecurity frameworks;

obtaining, from one or more sources that are different than the dynamic mapping data structure, first cybersecurity control information for each of the one or more first cybersecurity controls;

obtaining, from the one or more sources, second cybersecurity information for each of one or more second cybersecurity controls of one or more second cybersecurity frameworks that are different than the one or more first cybersecurity frameworks;

generating, for each combination of the one or more first cybersecurity controls and the one or more second cybersecurity controls, a related score based on a comparison of the first cybersecurity control information and the second cybersecurity information;

selecting a particular second cybersecurity control based on a particular relatedness score generated for a particular combination that includes the particular second cybersecurity control and a particular first cybersecurity control; and updating the dynamic mapping data structure to include the particular second cybersecurity control, wherein particular scan data mapped to the particular first cybersecurity control in the data structure is also mapped to the particular second cybersecurity control in the data structure.

16. The one or more non-transitory computer-readable media of claim 15, wherein the computing device to perform operations further comprising:

utilizing one or more sentence-to-vector tools to translate the first cybersecurity control information, obtained for the particular first cybersecurity control, to a first vector of values; and utilizing the one or more sentence-to-vector tools to translate the second cybersecurity control information, obtained for the particular second cybersecurity control, to a second vector of values.

17. The one or more non-transitory computer-readable media of claim 16, wherein the computing device to perform operations further comprising:

receive, as input, the first vector of values and the second vector of values as input; and generate, as output, the particular relatedness score.

18. The one or more non-transitory computer-readable media of claim 17, wherein the one or more neural networks are trained utilizing supervised machine learning with training data that includes training input cybersecurity control information and training output relatedness scores.

19. The one or more non-transitory computer-readable media of claim 15, wherein the particular relatedness score indicates semantic similarities between the first cybersecurity control information of the particular first cybersecurity control and the second cybersecurity control information of the particular second cybersecurity control.

20. The one or more non-transitory computer-readable media of claim 15, wherein the dynamic mapping data structure is updated to include the particular second cybersecurity control based on a determination that the particular relatedness score is greater than a threshold value.

21. The one or more non-transitory computer-readable media of claim 15, wherein the dynamic mapping data structure is updated to include the particular second cybersecurity control based on receiving user input.

* * * * *